(12) United States Patent
Tanaka

(10) Patent No.: US 6,702,448 B2
(45) Date of Patent: Mar. 9, 2004

(54) DOOR MIRROR FOR AUTOMOBILE

(75) Inventor: Yoshihisa Tanaka, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/195,550

(22) Filed: Jul. 16, 2002

(65) Prior Publication Data
US 2003/0026008 A1 Feb. 6, 2003

(30) Foreign Application Priority Data

Aug. 2, 2001 (JP) ......................................... 2001-234493
Oct. 1, 2001 (JP) ......................................... 2001-305044

(51) Int. Cl.[7] ................................................ G02B 5/08
(52) U.S. Cl. ......................... 359/838; 359/841; 359/844
(58) Field of Search ................................. 359/838, 841, 359/844, 507, 508, 509, 511

(56) References Cited

U.S. PATENT DOCUMENTS

| 4,462,303 A | * | 7/1984 | Gebhard | 454/164 |
| 4,898,458 A | * | 2/1990 | McDonald | 359/509 |
| 4,981,072 A | * | 1/1991 | Hanson et al. | 454/124 |
| 5,903,389 A | * | 5/1999 | Rumez et al. | 359/509 |
| 6,290,361 B1 | * | 9/2001 | Berzin | 359/507 |
| 6,481,863 B2 | * | 11/2002 | Horio et al. | 359/872 |

FOREIGN PATENT DOCUMENTS

| DE | 40 39 484 | 6/1992 |
| JP | 08-132965 | 5/1996 |

* cited by examiner

Primary Examiner—Mohammad Sikder
(74) Attorney, Agent, or Firm—Oblon, Spivak, McClelland, Maier & Neustadt, P.C.

(57) ABSTRACT

A plurality of baffle rails (4C) extending along a front-rear direction of a vehicle body are provided on a periphery of a mirror body (4) of an automotive door mirror (1), at least on a surface (4A) opposite a side of the vehicle body. Wind that sweeps along the periphery of the mirror body (4) during driving of the automobile passes along the baffle rails (4C) to the end of the surface (4A) without deviating partway from the surface (4A). Accordingly, the wind noise of about 1–3 kHz like a whistle may be reduced. The baffle rails (4C), which may serve as an accent of patterning, are provided without marring the beautifully designed appearance of the mirror body (4). The automotive door mirror (1) with the baffle rails (4C) lends itself to injection molding of the mirror body (4), and thus may be easily manufactured.

16 Claims, 5 Drawing Sheets

DOOR MIRROR FOR AUTOMOBILE

BACKGROUND OF THE INVENTION

This invention relates to door mirrors for an automobile or other vehicle, and more particularly to a door mirror improved in reduced wind noise.

In general, an automobile has a pair of door mirrors (or exterior rearview mirrors) mounted on right and left sides thereof to provide a driver with a view of areas behind a vehicle body from each side. The door mirror includes a mirror body mounted at a front portion of a front side door or other position of the automobile through a support base and a support stay, and a mirror element is attached in the mirror body in such a manner that makes an angle of the mirror adjustable in vertical and lateral directions.

In the automotive door mirror constructed as described above, the mirror body projects to the sides of the vehicle body, and a front (surface facing frontward) thereof takes on various shapes, typically a shape having good aerodynamic property, i.e., with a ridge-like surface, a curved surface, or the like. However, airflow passing along a periphery of the mirror body is likely to generate wind noise of about 1–3 kHz like a whistle, and reduction of such noise has been in demand.

Among previously proposed solutions for such wind noise reduction known in the art are a plurality of recesses (adjacent uneven sections) provided on the periphery of the mirror body (housing) to generate vortices (breakup) in the airflow that passes, as disclosed in German Patent Publication No. DE 4039484 A1, and a large number of dimples provided on a back (surface facing frontward) of the mirror body (mirror box) which dimples are distributed partway from a vehicle body-side end of the back surface to generate vortices (disturbance) in the airflow that passes, as disclosed in Japanese Laid-Open Patent Application, Publication No. JP 8-132965 A (see FIG. 9).

The plurality of recesses or large number of dimples thus provided on the periphery of the mirror body however could utterly mar a beautifully designed appearance of the mirror body. Moreover, such a large number of dimples that must be integrally formed on the periphery of the mirror body would require a large number of spherical projections corresponding to the dimples to be formed on a cavity surface of an injection mold for the mirror body, and would thus necessitate such a difficult task of major design changes as forming the large number of spherical projections on the cavity surface after completion of the mold. In addition, the mold must have a separable structure with multiple parts so that the mold may open to eject the final casting.

SUMMARY OF THE INVENTION

It is thus an exemplified object of the present invention to provide an automotive door mirror that is capable of abating wind noise without marring a beautifully designed appearance of a mirror body thereof and that lends itself to injection molding of the mirror body.

An automotive door mirror according to one aspect of the present invention includes a mirror body mounted on a side of a vehicle body through a support base and a support stay, and a plurality of baffle rails extending along a front-rear direction of the vehicle body are provided on a periphery of the mirror body, at least on a surface opposite a side of the vehicle body.

With this door mirror, wind that sweeps along the periphery of the mirror body during driving of the automobile passes along the plurality of baffle rails to the end of the surface without deviating partway from the surface. Accordingly, the wind noise of about 1–3 kHz like a whistle, as has been conventionally recognized as a drawback, may be reduced. Further, the plurality of baffle rails may serve as an accent of patterning, so as not to mar the beautifully designed appearance of the mirror body.

In the above automotive door mirror, the mirror body may preferably be comprised of an injection-molded casting integrally formed of plastic (synthetic resin), and the baffle rails may be so provided as to extend along a direction in which the mold for the mirror body opens. With this automotive door mirror, an injection molding operation may be performed more easily. Moreover, the mold for the above mirror body may be prepared by making use of an existing mold for a mirror body having no baffle rail on the periphery thereof, as grooves corresponding to the baffle rails may be added into a cavity surface of the existing mold; therefore, the mold for the above mirror body may be manufactured with ease.

Other objects and further features of the present invention will become readily apparent from the following description of preferred embodiments with reference to accompanying drawings.

DETAILED DESCRIPTION OF THE PREFERRED EMBODIMENTS

Figure 1:
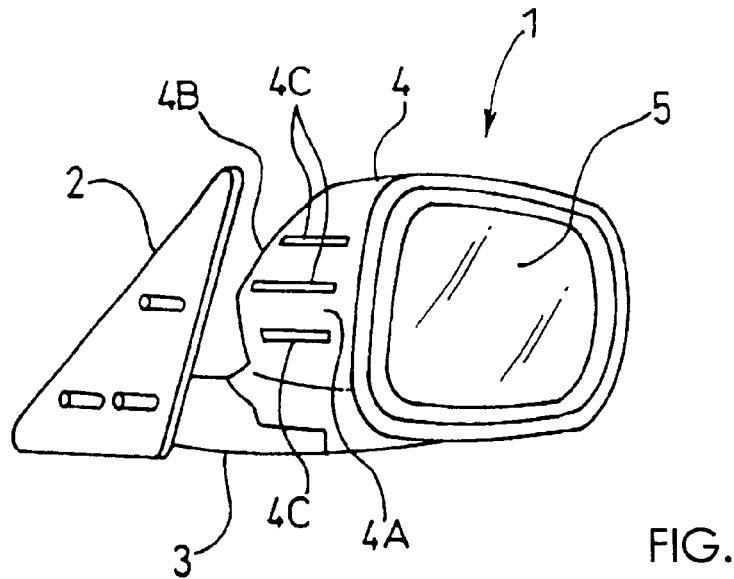
FIG. 1 is a perspective view showing an automotive door mirror according to one exemplified embodiment of the present invention.
Figure 2:
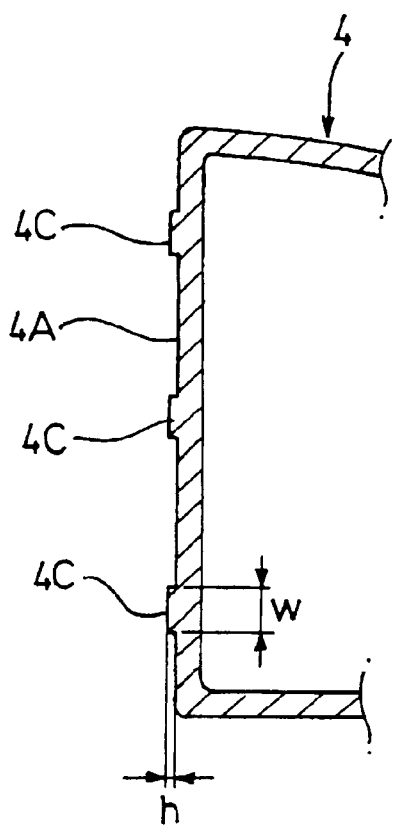
FIG. 2 is a partial longitudinal section of a side portion of a mirror body as shown in FIG. 1.

A description will be given of preferred embodiments of an automotive door mirror according to the present invention with reference to the drawings. Among the drawings referenced hereinafter, FIG. 1 shows an outward appearance, in perspective, of an automotive door mirror according to one exemplified embodiment of the present invention; FIG. 2 shows a partial longitudinal section of a periphery of a mirror body of the automotive door mirror as shown in FIG. 1.

The automotive door mirror in the present embodiment is mounted on a front portion of right and left front side doors that constitute side panels of a vehicle body of an automobile (not shown). Since the right and left automotive door mirrors are provided symmetrically on the right and left sides of the vehicle body, a description will be given of a right-side automotive door mirror, and a description will be omitted of a left-side automotive door mirror for the expediency of explanation.

The automotive door mirror 1 according to the present embodiment as shown in FIG. 1 includes a mirror body 4 mounted on a front portion of a right front side door of a vehicle body through a support base 2 and a support stay 3.

The support base 2 is a triangular plate member that is fixed in a triangular space formed between a front door panel and a door sash (or front pillar) in the front portion of the front side door (not shown), and constitutes a part of a side of the vehicle body. The support stay 3 is a flat hollow support member that projects from a lower portion of the support base 2 in a nearly horizontal sideward direction, and a distal end thereof supports a bottom portion of a side 4A of the mirror body 4 in such a manner as to make the mirror body 4 foldable by turning the same laterally about a vertical axis.

The mirror body 4 is a member having an opening facing rearward in which a mirror element 5 is fitted so that the mirror body 4 encloses the mirror element 5, and the side 4A thereof opposite the front side door constituting a part of the side of the vehicle body is a nearly vertical flat surface. A front 4B of the mirror body 4 facing frontward is formed with a ridge-like or curved surface that may divide wind lashing the front 4B during driving of the automobile.

The mirror element 5 is typically configured to accept adjustments to a tilt angle in vertical and lateral directions using a motor drive included in the mirror body 4, though such adjustments may alternatively be made manually.

Each of the support base 2 and the support stay 3 is formed in one piece with a plug inserted upon molding, and the mirror body 4 is integrally injection-molded of plastic.

On the side 4A of the mirror body 4 are integrally formed three, four or five baffle rails 4C (of which three are provided in the embodiment illustrated) extending in a front-rear direction of the vehicle body, as shown in FIGS. 1 and 2. The baffle rails 4C have a width w of approximately 1 mm, a protrusion height h of approximately 0.2 mm, and are arranged in a vertical direction on the side 4A at regular intervals. The baffle rails are very small, actually even smaller than illustrated, and extend along the direction in which the injection mold for the mirror body 4 opens to facilitate the injection molding of the mirror body 4.

The automotive door mirror 1 as one exemplified embodiment that has been described above has each baffle rail 4C of the mirror body 4 so provided as to extend along the direction in which the injection mold for the mirror body 4 opens upon ejecting the casting, and thus the baffle rails 4C may be integrally injection-molded together with the mirror body 4 easily.

Moreover, the injection mold for the mirror body 4 may be obtained only by adding a plurality of grooves corresponding to the baffle rails 4C on the cavity surface of the existing mold for a mirror body having no baffle rail on a side thereof. Therefore, the injection mold for the mirror body 4 may be manufactured easily without major design changes.

Figure 3:
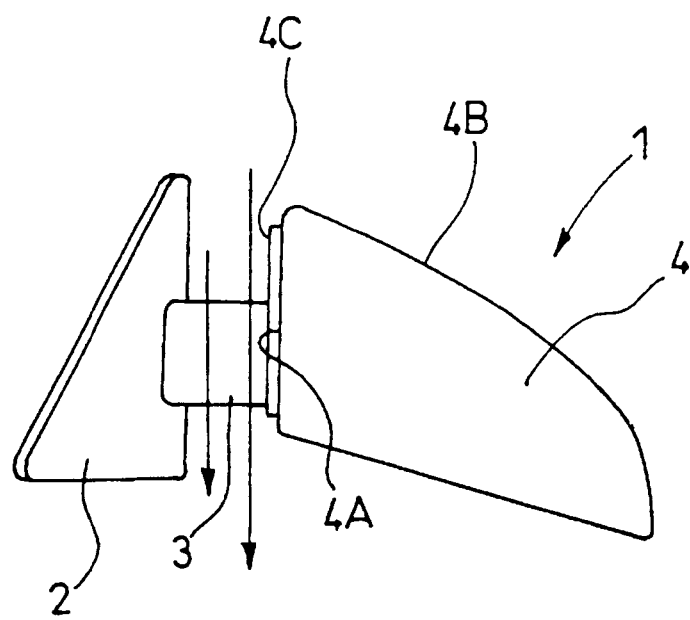
FIG. 3 is a plan view for illustrating operation of the automotive door mirror according to the embodiment as shown in FIG. 1.

In the automotive door mirror 1 as one exemplified embodiment as described above, wind passes between the support base 2 mounted on a front portion of the front side door at the side of the vehicle body and the mirror body 4 during driving of the automobile (not shown), as shown in FIG. 3. In that event, the wind that passes along the side 4A of the mirror body 4 smoothly flows along the three, four or five baffle rails 4C (of which three are provided in the embodiment as illustrated) to the end of the side 4A, without deviating partway from the side 4A, whereby disturbances of the wind may be prevented. Consequently, wind noise of about 1–3 kHz like a whistle may be reduced.

It is thus to be understood that the present invention is directed to the wind noise reduction utilizing the baffling effect of the baffle rails 4C, and that the baffle rails 4C are not intended either to generate a vortices or to utilize the action of such vortices to reduce the wind noise, unlike the recesses disclosed in German Patent Publication No. DE 403948 A1.

Figure 4:
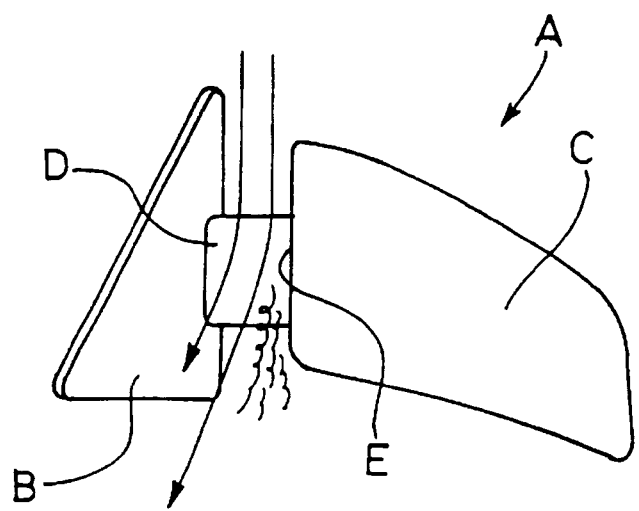
FIG. 4 is a plan view for illustrating operation of a conventional automotive door mirror.
Figure 5:
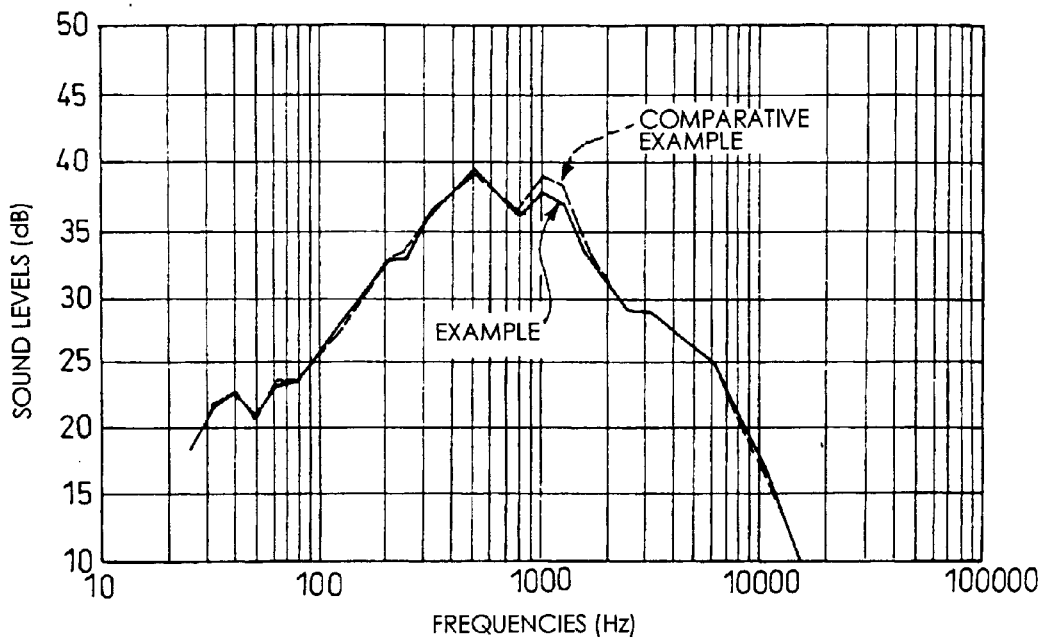
FIG. 5 is a graph showing measured values of wind noise produced upon driving at 60 km per hour.
Figure 6:
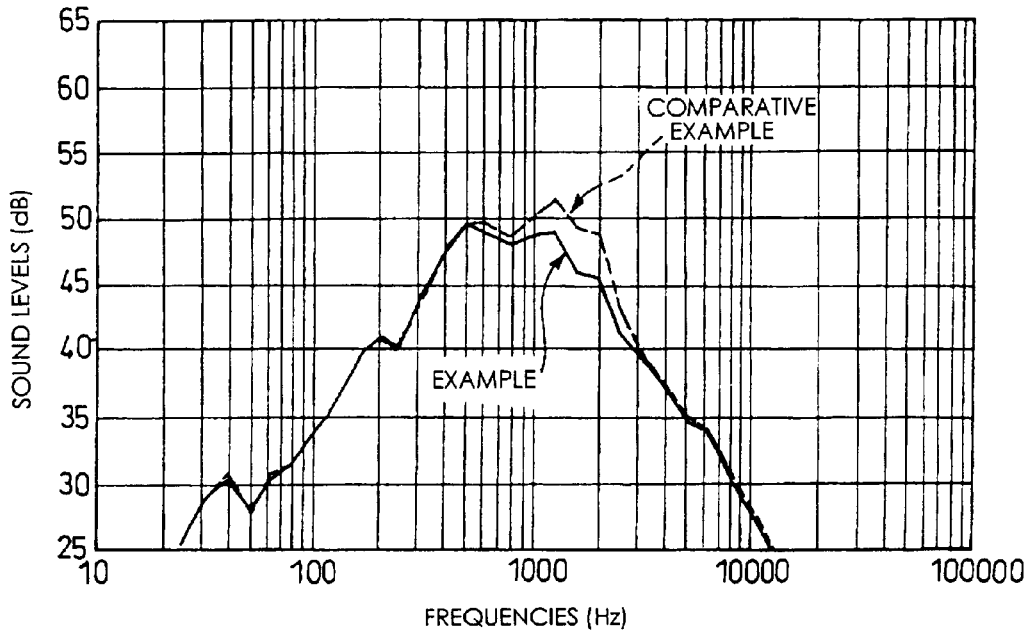
FIG. 6 is a graph showing measured values of wind noise produced upon driving at 80 km per hour.
Figure 7:
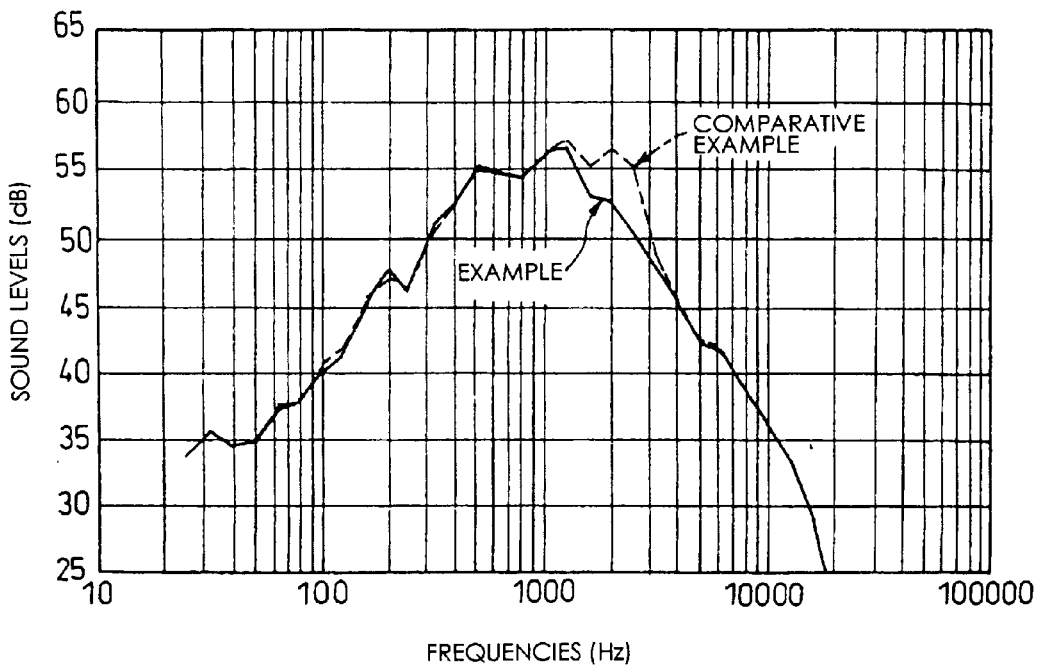
FIG. 7 is a graph showing measured values of wind noise produced upon driving at 100 km per hour.

In contrast, a conventional automotive door mirror A as shown in FIG. 4, which has no baffle rail 4C as provided in the automotive door mirror 1 according to the present embodiment, produces wind noise of about 1–3 kHz like a whistle due to disturbances of wind that passes along a side E of a mirror body C and partway deviated from a side E when the wind flows above a support stay D between a support base B and the mirror body C during driving of an automobile (not shown).

According to the automotive door mirror 1 as one exemplified embodiment as described above, the above three, four or five baffle rails 4C (of which three are provided in the embodiment as illustrated) are each 1 mm in width, and 0.2 mm in protrusion height, i.e., so small that the baffle rails 4C are inconspicuous for its outer appearance, and nevertheless a sufficient abating effect on wind noise of 1–3 kHz may be achieved. Therefore, the inconspicuous baffle rails 4C never mar the beautifully designed appearance of the mirror body 4

In order to realize the aforementioned baffle rails 4C according to the present invention that may achieve a sufficient wind noise-abating effect without losing the inconspicuous appearance, preferably, the width may range 0.5–1.5 mm and the protrusion height may range 0.1–0.3 mm. More preferably, the width may be 0.8–1.2 mm and the protrusion height may be 0.15–0.25 mm, and the best width may be 0.9–1.1 mm and the best protrusion height may be 0.18–0.22 mm.

On the other hand, if the baffle rails 4C are used as an accent of patterning and thus the inconspicuous appearance is not essential, the baffle rails 4C having a width of 2 mm or so and a protrusion height of 1 mm or so may be employed because it may bring about a sufficient wind noise abating effect as well. In this instance, the baffle rails 4C serve as an accent of patterning, and thus does not mar the beautifully designed appearance of the mirror body 4.

The baffle rails 4C may preferably be spaced at intervals of 30 mm or below. This is because the baffle rails 4C spaced at intervals of 30 mm or below may prevent wind passing along the side E of the mirror body C from deviating partway from the side E, and may thereby serve to reduce wind noise of about 1–3 kHz like a whistle. Provision of three of the baffle rails 4C makes spacing between each adjacent baffle rail 4C approximately 30 mm, whereas provision of five of the baffle rails 4C makes spacing between each adjacent baffle rail 4C less than 30 mm. The number of the baffle rails 4C that fits the purpose of making the appearance of the baffle rails 4C as inconspicuous as possible is preferably three, four or five, more preferably three or four, and most preferably three.

The baffle rails 4C most preferably take on a rectangular shape (having edges) as viewed from the top. Rounded or chamfered edges of the rectangular top faces, or streamlined or curved shape of the top faces would lessen the wind noise abating effect. Even if the edges were rounded or shaped otherwise, raising the height of the baffle rails 4C could possibly prevent the wind noise abating effect from diminishing, but would disadvantageously make the baffle rails 4C conspicuous.

For the same reasons as discussed above, the baffle rails 4C most preferably take on a rectangular shape (having edges) in cross section.

Each baffle rail to be formed on the side of the mirror body in the automotive door mirror according to the present invention may be prepared as a sheet member or the like to be stuck on the mirror body. Such a sheet member makes it possible to provide each baffle rail with perfect ease only by sticking the sheet member on the side of the mirror body.

EXAMPLE

The automotive door mirror 1 described above as one exemplified embodiment of the present invention (with three baffle rails 4C each having a width of 1 mm, and a protrusion height of 0.2 mm, and spaced at intervals of 30 mm) was put into practice by way of example, while an automotive door mirror having an identical structure with the automotive door mirror 1 except that no baffle rail is formed was prepared by way of comparison. These door mirrors were installed on the front side door of automobiles of the same types, and wind noise levels during driving of the automobile were measured.

Each automobile was driven at the speeds of 60 km per hour, 80 km per hour, 100 km per hour, and 120 km per hour, with the right and left front side doors closed, and the levels of the wind noise heard outside the automobile were measured.

Figure 8:
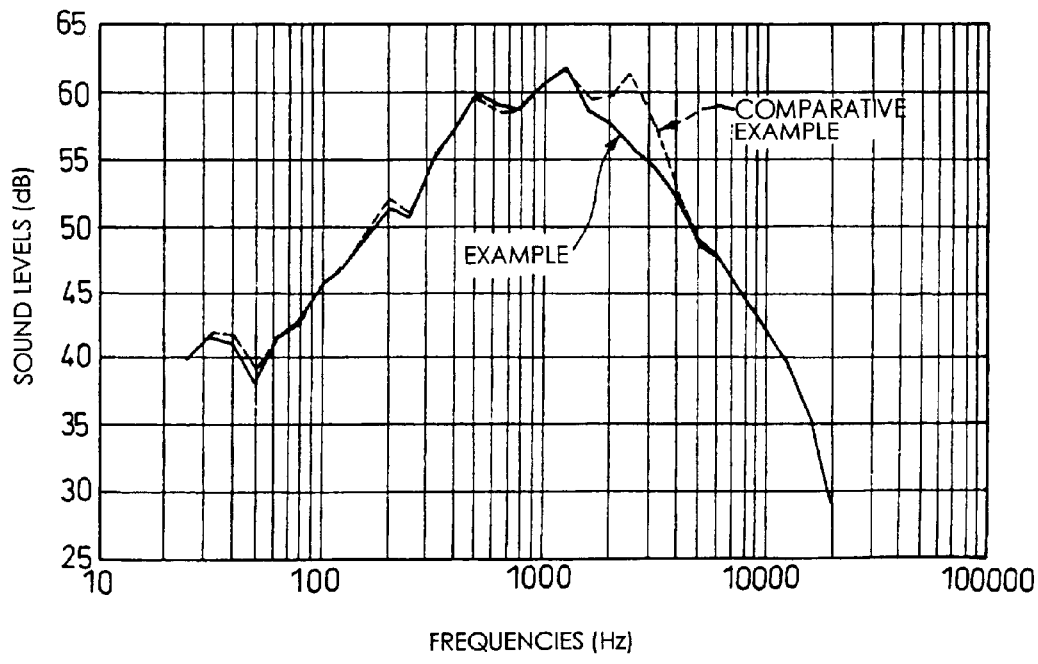
FIG. 8 is a graph showing measured values of wind noise produced upon driving at 120 km per hour.
Figure 9:
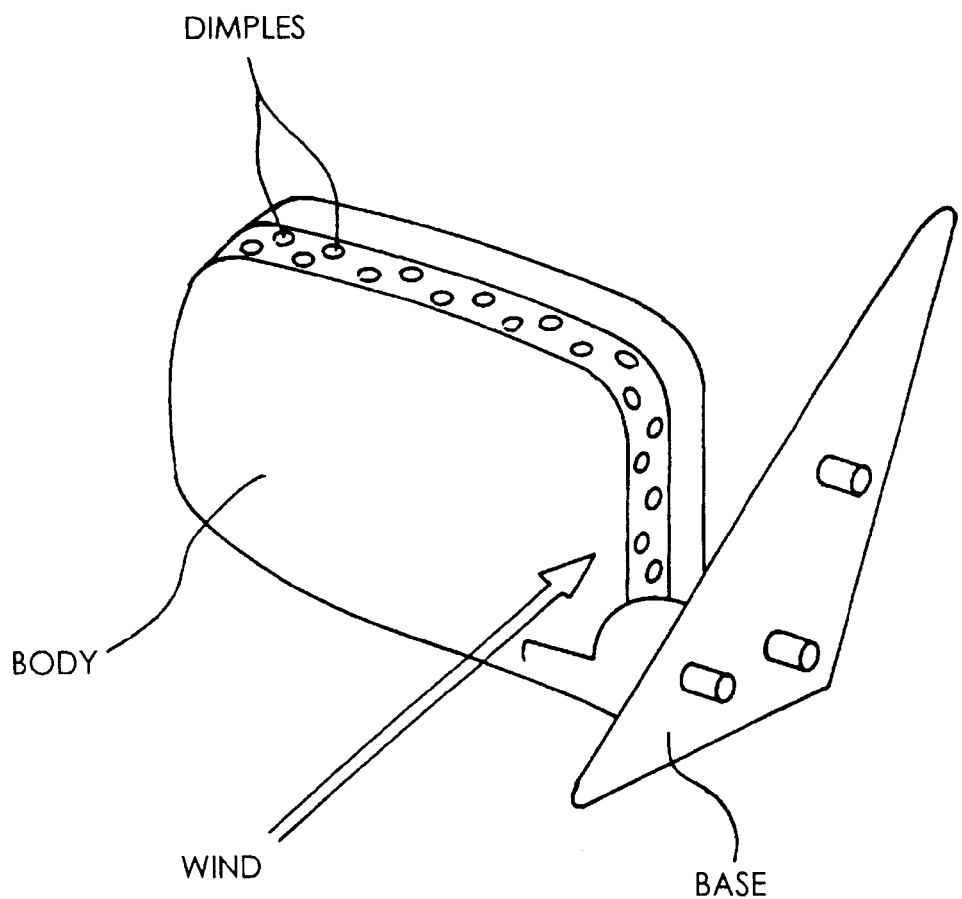
FIG. 9 is a perspective view of a conventional door mirror having a large number of dimples provided on a mirror body.

Measurements of the example of the present embodiment are indicated by solid lines in FIGS. 5 through 8, while measurements of the comparative example are indicated by broken lines in FIGS. 5 through 8. As is evident from the graphs shown in FIGS. 5 through 8, it is shown that the wind noise levels of 1–3 kHz like a whistle produced in the present example were reduced relative to the comparative example in each experiment of 60 km per hour (FIG. 5), 80 km per hour (FIG. 6), 100 km per hour (FIG. 7), and 120 km per hour (FIG. 8). At 80 km per hour, in particular, reduction of about 2–5 dB in wind noise of 1–3 kHz was observed. Further, it turned out that reduction of about 5 dB in wind noise of 2 kHz or so was achieved at 100 km per hour. Furthermore, it turned out that reduction of about 5 dB in wind noise of 2–3 kHz was achieved at 120 km per hour.

Although the preferred embodiments of the present invention have been described above, various modifications and changes may be made in the present invention without departing from the spirit and scope thereof.

With this door mirror, wind that sweeps along the periphery of the mirror body during driving of the automobile passes along the plurality of baffle rails to the end of the surface without deviating partway from the surface. Accordingly, the wind noise of about 1–3 kHz like a whistle, as has been conventionally recognized as a drawback, may be reduced. Further, the plurality of baffle rails may serve as an accent of patterning, so as not to mar the beautifully designed appearance of the mirror body.

In the above automotive door mirror, the mirror body may preferably be comprised of an injection-molded casting integrally formed of synthetic resin (plastic), and the baffle rails may be so provided as to extend along a direction in which the mold for the mirror body opens. With this automotive door mirror, an injection molding operation may be performed more easily. Moreover, the mold for the above mirror body may be prepared by making use of an existing mold for a mirror body having no baffle rail on the periphery thereof, as grooves corresponding to the baffle rails may be added into a cavity surface of the existing mold; therefore, the mold for the above mirror body may be manufactured with ease.

What is claimed is:

1. An automotive door mirror comprising:
   a mirror body mounted on a side of a vehicle body and having an outer peripheral surface facing the side of the vehicle body; and
   a plurality of baffle rails provided on the outer peripheral surface to extend along a front-rear direction of the vehicle body in order to reduce wind noise.

2. An automotive door mirror according to claim 1, wherein each of the baffle rails has a width of 0.5 mm through 1.5 mm, and a protrusion height of 0.1 mm through 0.3 mm.

3. An automotive door mirror according to claim 1, wherein a number of the baffle rails is any one of 3 through 5.

4. An automotive door mirror according to claim 1, wherein the mirror body is comprised of an injection-molded casting integrally formed of plastic; and wherein the baffle rails extend along a direction in which the mold for the mirror body opens.

5. An automotive door mirror according to claim 1, wherein the baffle rails are formed in advance on a sheet member to be stuck on the mirror body.

6. An automotive door mirror according to claim 2, wherein a number of the baffle rails is any one of 3 through 5.

7. An automotive door mirror according to claim 2, wherein the mirror body is comprised of an injection-molded casting integrally formed of plastic; and wherein the baffle rails extend along a direction in which the mold for the mirror body opens.

8. An automotive door mirror according to claim 3, wherein the mirror body is comprised of an injection-molded casting integrally formed of plastic; and wherein the baffle rails extend along a direction in which the mold for the mirror body opens.

9. An automotive door mirror according to claim 6, wherein the mirror body is comprised of an injection-molded casting integrally formed of plastic; and wherein the baffle rails extend along a direction in which the mold for the mirror body opens.

10. An automotive door mirror according to claim 2, wherein the baffle rails are formed in advance on a sheet member to be stuck on the mirror body.

11. An automotive door mirror according to claim 3, wherein the baffle rails are formed in advance on a sheet member to be stuck on the mirror body.

12. An automotive door mirror according to claim 4, wherein the baffle rails are formed in advance on a sheet member to be stuck on the mirror body.

13. An automotive door mirror according to claim 6, wherein the baffle rails are formed in advance on a sheet member to be stuck on the mirror body.

14. An automotive door mirror according to claim 7, wherein the baffle rails are formed in advance on a sheet member to be stuck on the mirror body.

15. An automotive door mirror according to claim 8, wherein the baffle rails are formed in advance on a sheet member to be stuck on the mirror body.

16. An automotive door mirror according to claim 9, wherein the baffle rails are formed in advance on a sheet member to be stuck on the mirror body.

* * * * *